United States Patent [19]

Nishida et al.

[11] Patent Number: 5,464,913
[45] Date of Patent: Nov. 7, 1995

[54] CYCLOALIPHATIC EPOXY AND PRIMARY HYDROXYL GROUPS-CONTAINING CATIONIC RESIN

[75] Inventors: Reiziro Nishida; Akira Tominaga, both of Hiratsuka, Japan

[73] Assignee: Kansai Paint Co., Ltd., Hyogo, Japan

[21] Appl. No.: 389,740

[22] Filed: Feb. 15, 1995

Related U.S. Application Data

[63] Continuation of Ser. No. 231,455, Apr. 20, 1994, abandoned, which is a continuation of Ser. No. 835,031, Feb. 6, 1992, abandoned, which is a continuation of Ser. No. 493,685, Mar. 15, 1990, abandoned.

[51] Int. Cl.$^6$ .......................... C08L 63/02; C08L 63/08; C08K 3/20
[52] U.S. Cl. .................. 525/524; 525/486; 525/523; 523/404; 523/414
[58] Field of Search ...................... 523/404, 414; 525/327.3, 524, 486, 523

[56] References Cited

U.S. PATENT DOCUMENTS

| | | | |
|---|---|---|---|
| 3,988,281 | 10/1976 | Minami et al. | 525/327.3 |
| 4,364,860 | 12/1982 | Patzschke et al. | 525/327.3 |
| 4,496,672 | 1/1985 | Batzill et al. | 523/404 |
| 4,542,173 | 9/1985 | Schupp et al. | 523/414 |
| 4,565,859 | 1/1986 | Murai et al. | 525/327.3 |
| 4,609,691 | 9/1986 | Geist et al. | 523/414 |
| 4,622,117 | 11/1986 | Geist et al. | 525/327.3 |
| 4,780,524 | 10/1988 | Dobblestein et al. | 523/414 |
| 5,064,880 | 11/1991 | Rao et al. | 523/404 |
| 5,089,542 | 2/1992 | Nishida et al. | 525/117 |
| 5,096,984 | 3/1992 | Nishida et al. | 523/404 |

FOREIGN PATENT DOCUMENTS

| | | |
|---|---|---|
| 0356970 | 3/1990 | European Pat. Off. . |
| 2041944 | 9/1980 | United Kingdom . |
| 80/01071 | 5/1980 | WIPO . |

Primary Examiner—Robert E. Sellers
Attorney, Agent, or Firm—Wenderoth, Lind & Ponack

[57] ABSTRACT

A self-curing cationically electrodepositable resin useful as a paint composition having in the molecule:

(1) a primary hydroxyl group,
(2) a cationic group, and
(3) at least one epoxy group-containing functional group represented by the following structural formulas (I) and (II):

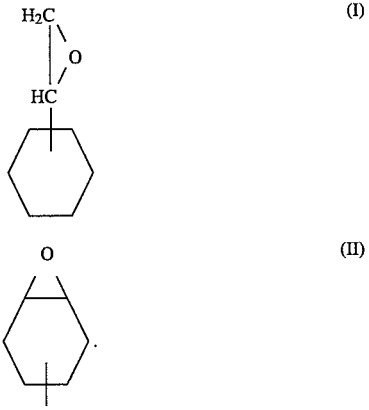

The electrodepositable resin is obtained by the reaction of an epoxy resin with at least three epoxy group-containing functional groups of structural formulas (I) and (II), a cationizing agent such as amino compounds, and a compound having at least one phenolic hydroxyl group per molecule.

8 Claims, No Drawings

CYCLOALIPHATIC EPOXY AND PRIMARY HYDROXYL GROUPS-CONTAINING CATIONIC RESIN

This application is a continuation of now abandoned application Ser. No. 08/231,455, filed Apr. 20, 1994, which is a continuation of now abandoned application Ser. No. 07/835,031, filed Feb. 6, 1992, which is a continuation of now abandoned application Ser. No. 07/493,685, filed Mar. 15, 1990.

The present invention relates to a self-curing resin suited for use in cationically electrodepositable paints, as well as to a resin composition containing said resin for cationically electrodepositable paint.

As a conventional resin composition for a cationically electrodepositable paint, a resin composition comprising an aromatic polyisocyanate compound blocked by alcohols (curing agent) and a polyamine resin such as an amine-added epoxy resin as a primary component is most widely used. This has earned an excellent assessment with reference to corrosion resistance of the paint film. However, this resin composition has essential defects in the following points. First of all, curing initiating temperature is high (at least 170° C.), and to lower this curing initiating temperature, when an organotin compound is used as a curing catalyst, said tin compound sometimes poisons an exhaust combustion catalyst of the baking furnace. Further, to cure the paint film, when the film is heated at a high temperature, the blocked polyisocyanate thermally decomposes to produce gum and soot. This, in addition, brings about yellowing, bleeding and curing impediment of the top coat film. At the same time, said top coat film remarkably lowers in weather resistance and tends to be whitened. These are serious drawbacks and therefore the improvement thereof is strongly desired.

Meanwhile, a resin composition for an electrodepositable paint utilizing a self-curability due to a ring-opening reaction of an epoxy group without using a curing agent is also known. This is proposed, for example, in GB-1306101A, GB-1306102A and GB-1327071A as well as U.S. Pat. Nos. 3,937,679 and 3,975,346, in none of which, the stability of the bath for the electrodepositable paint is compatible with the curability of the paint film. For example, the glycidyl ether type polyepoxy compound which is most general of these resin compositions is excellent in the curability, but inferior in the bath stability.

Also, the amine-added product of epoxidized polybutadiene is superior to some extent in self-crosslinkability and curability, but is inferior in bath stability. Further, as alicyclic epoxy compounds, there are commercially available those of mono- or bi-functionality. When an amine compound is added to these alicyclic epoxy compounds in order to introduce a cationic group to these compounds, the resulting addition products have only one or-less epoxy group in the molecule and are low-molecular compounds, and accordingly have been unable to provide a sufficiently cured film.

Hence, the present inventors had previously proposed, as a resin composition for cationically electrodepositable paint which had the merits possessed by isocyanate curing type compounds but which was different from blocked polyisocyanate compounds and yet solved the above-mentioned drawbacks, a resin composition for cationically electrodepositable paint comprising (a) a basic resin having a primary hydroxyl group and a cationic group and (b) a resin as a curing agent, having an epoxy group-containing functional group represented by the following structural formula

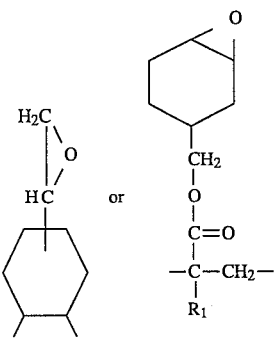

wherein $R_1$ is a hydrogen atom or a methyl group (U.S. patent application Ser. No. 07/401138 filed on Aug. 30, 1989; EP-A-356970). The film formed with the above resin composition can be cured at low temperatures of 160° C. or less with no tin catalyst required. The resin composition uses neither blocked isocyanate compound nor its derivative and accordingly produces neither gum nor soot, and moreover gives no adverse effect on the top coat film. The resin composition causes no volume shrinkage due to thermal decomposition and shows good adhesion to the substrate. The crosslink contains neither aromatic urethane bond nor aromatic urea bond and accordingly the cured film of the resin composition has good weather resistance. Thus, the resin composition has various advantages.

The cationically electrodepositable paint comprising the above resin composition as a major component has excellent stability. The present inventors had interpreted that the excellent stability is due to the following reasons. That is, the cationic group of the basic resin and the free epoxy group of the curing agent are separated from each other. As a result, the curing agent which is oleophilic is contained in the basic resin in emulsion particles, and the cationic group which is hydrophilic exists at the interface of the aqueous phase, accordingly the cationic group is not directly involved in the ring-opening reaction of the epoxy group.

The present inventors made further study on the above resin composition and, as a result, surprisingly found that the epoxy group-containing functional group represented by the above-mentioned structural formula, quite differently from other epoxy groups such as glycidyl group and the like, not only makes a curing reaction actively with a primary hydroxyl group, etc. but also is highly stable even when a cationic group is present in the same resin molecule, and such a resin is useful as a self-curing resin.

That is, the present inventors found that a resin having in the molecule a primary hydroxyl group, a cationic group and a particular epoxy group is useful as a self-curing resin for cationically electrodepositable paint. This is because the resin can cure by itself without requiring any curing agent such as blocked polyisocyanate compound or the like, has excellent bath stability and excellent film curability without reducing the corrosion resistance of film, is free from various drawbacks seen when an organotin compound and a blocked polyisocyanate compound are used, causes no strain due to volume shrinkage and accordingly shows excellent adhesion to the substrate, provides a film of excellent weather resistance, and further has excellent curability even at low temperatures. This finding has achieved the present invention.

Therefore, according to the present invention there is provided a cationically electrodepositable resin having in the molecule:

(1) a primary hydroxyl group,
(2) a cationic group, and
(3) at least one epoxy group-containing functional group represented by the following structural formulas (I) and (II).

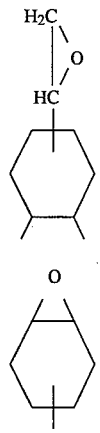

The cationically electrodepositable resin of the present invention is characterized in that the film formed therewith cures at temperatures of 250° C. or less and, when the resin is used together with a catalyst, particularly at least one compound containing a metal such as lead, zirconium, cobalt, aluminum, manganese, copper, zinc, iron, chromium, nickel or the like, the resin causes the ring-opening of epoxy group even by heating at low temperatures of 80°–160° C., followed by the reaction of the ring-opened epoxy group with the hydroxyl group or other epoxy group and resultant crosslinking and curing.

Accordingly, the resin composition for cationically electrodepositable paint, comprising the resin of the present invention can be cured at low temperatures of 160° C. or less with no tin catalyst required. It is free from various drawbacks seen when a blocked isocyanate compound or its derivative is used because the use of such a compound or derivative is unnecessary. It causes no volume shrinkage due to thermal decomposition and shows good adhesion to the substrate. It has good weather resistance when made into a film, because the formed crosslink contains neither aromatic urethane bond nor aromatic urea bond. Also it has excellent stability and excellent curability. Thus, the resin composition has various advantages.

The cationically electrodepositable resin of the present invention (hereinafter referred to as "present invention" in some cases) has in the molecule all of the following groups:

(1) a primary hydroxyl group [the main action of this group is to make a crosslinking and curing reaction mainly with a particular epoxy group mentioned in (3) which follows], (2) a cationic group (the main action of this group is to make the present resin dispersible in water), and (3) a particular epoxy group represented by the above structural formula (I) or (II), and can be produced by using, for example, an epoxy resin having a functional group represented by the above structural formula (I) or (II) [the epoxy resin is hereinafter referred to as "epoxy resin (A)" in some cases], as a starting material.

As the epoxy resin having a functional group represented by the structural formula (I) [the resin is hereinafter referred to as "epoxy resin (A-I)" in some cases], there can be used a per se known epoxy resin described in, for example, U.S. Pat. No. 4,565,859 and Japanese Laid-Open Patent Publication No. 135467/1987. The epoxy resin (A-I) may have, at the molecular end, a residue of polymerization initiator, i.e. a residue of active hydrogen-containing organic compound. As the active hydrogen-containing organic compound, there can be mentioned, for example, an alcohol, a phenol, a carboxylic acid, an amine and a thiol. The alcohol can be a monohydric alcohol or a di- or higher hydric alcohol and specifically includes, for example, aliphatic monohydric alcohols (e.g. methanol, ethanol, propanol, butanol, pentanol, hexanol, octanol), aromatic monohydric alcohols (e.g. benzyl alcohol), and polyhydric alcohols (e.g. ethylene glycol, diethylene glycol, triethylene glycol, polyethylene glycol, propylene glycol, dipropylene glycol, 1,3-butanediol, 1,4-butanediol, pentanediol, 1,6-hexanediol, neopentylglycol, oxypivalic acid-neopentyl glycol ester, cyclohexanedimethanol, glycerine, diglycerine, polyglycerine, trimethylolpropane, trimethylolethane, pentaerythritol, dipentaerythritol). The phenol includes, for example, phenol, cresol, catechol, pyrogallol, hydroquinone, hydroquinone monomethyl ether, bisphenol A, bisphenol F, 4,4'-dihydroxybenzophenone, bisphenol S, phenolic resin and cresol-novolac resin.

The carboxylic acid includes, for example, formic acid, acetic acid, propionic acid, lactic acid and fatty acids of animal and vegetable oils; as well as polycarboxylic acids such as fumaric acid, maleic acid, adipic acid, dodecanediacid, trimellitic acid, pyromellitic acid, polyacrylic acid, phthalic acid, isophthalic acid, terephthalic acid and the like. As the carboxylic acid, there can also be used compounds having a carboxyl group and a hydroxyl group, such as lactic acid, citric acid, oxycaproic acid and the like. As the active hydrogen-containing group, there can be used polyvinyl alcohol, partial hydrolyzate of polyvinyl acetate, starch, cellulose, cellulose acetate, cellulose acetate butyrate, hydroxyethyl cellulose, allyl polyol resin, styrene-allyl alcohol copolymer resin, styrene-maleic acid copolymer resin, alkyd resin, polyester polyol resin, polycaprolactone polyol resin, etc. The active hydrogen-containing compound may have not only an active hydrogen but also an unsaturated double bond in the skeleton, wherein the unsaturated double bond may be oxidized.

The epoxy resin (A-I) having, as a functional group, mainly a functional group represented by the structural formula (I) can be generally obtained, as described in detail in the above Patent Publication, by subjecting 4-vinylcyclohexene-1-oxide to ring-opening homopolymerization or to ring-opening copolymerization with other epoxy group-containing compound using the active hydrogen-containing organic compound as an initiator to form a polyether (co)polymer (i.e. a ring-opening homopolymer of a cyclohexene oxide having a vinyl group as a side chain or a ring-opening copolymer of said oxide and other epoxy group-containing compound) and then epoxidizing part or all of the vinyl groups ($CH_2$=CH—) contained in the side chains of the polyether (co)polymer, with a peracid (e.g. performic acid, peracetic acid, perbenzoic acid, trifluoroperacetic acid) or a hydroperoxide (e.g. hydrogen peroxide, tert-butyl hydroperoxide, cumeme peroxide).

The other epoxy group-containing compound used in forming the ring-opening copolymer can be any epoxy-containing compound, but is preferably a compound having one epoxy group in the molecule, in view of easiness of production. As such a compound, there can be mentioned, for example, oxides of unsaturated group-containing compounds, such as ethylene oxide, propylene oxide, butylene oxide, styrene oxide and the like; ethers of glycidyl alcohol and a hydroxyl group-containing compound, such as allyl glycidyl ether, 2-ethylhexyl glycidyl ether, phenyl glycidyl ether and the like; and esters of glycidyl alcohol and an organic carboxylic acid (e.g. fatty acid).

The other epoxy group-containing compound further includes alicyclic oxirane group-containing vinyl monomers represented by the following formulas (1) to (12).

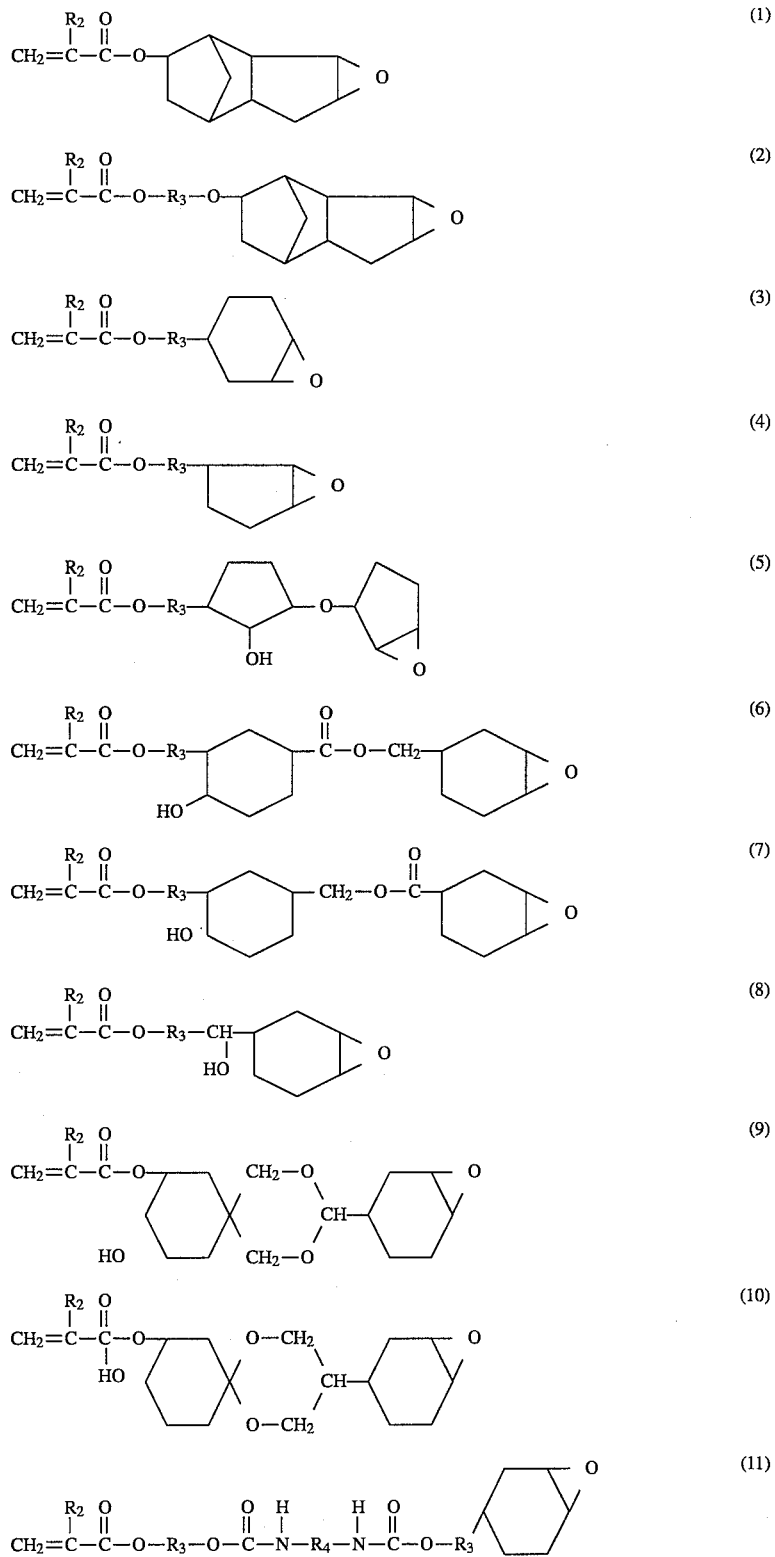

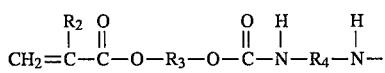 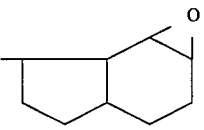 (12)

-continued

In the above general formulas, $R_2$ is a hydrogen atom or a methyl group; $R_3$ is a bivalent aliphatic saturated hydrocarbon group of 1–6 carbon atoms; and $R_4$ is a bivalent hydrocarbon group of 1–10 carbon atoms.

As the bivalent aliphatic saturated hydrocarbon group of 1–6 carbon atoms represented by $R_3$, these can be mentioned straight chain or branched chain alkylene groups such as methylene, ethylene, propylene, tetramethylene, ethylethylene, pentamethylene, hexamethylene and the like. As the bivalent hydrocarbon group of 1–10 carbon atoms represented by $R_4$, there can be mentioned, for example, methylene, ethylene, propylene, tetramethylene, ethylethylene, pentamethylene, hexamethylene, polymethylene, phenylene,

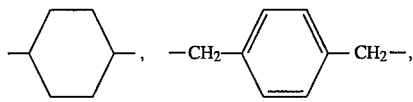

etc.

Specific examples of the above alicyclic oxirane group-containing vinyl monomers include 3,4-epoxycyclohexylmethyl acrylate and 3,4-epoxycyclohexylmethyl methacrylate. These compounds are commercially available as, for example, METHB and AETHB (trade names) manufactured by DAICEL CHEMICAL INDUSTRIES, LTD. All of these commercial products are represented by the following general formula

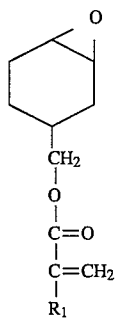

wherein $R_1$ is a hydrogen atom or a methyl group.

The compound represented by the following general formula

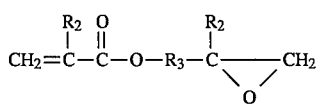 (13)

wherein $R_2$ and $R_3$ have the same definitions as given above can also be used as the other epoxy group-containing compound. Specific examples of such a compound are glycidyl acrylate and glycidyl methacrylate. As the other epoxy group-containing compound, there can further be mentioned, for example, an epoxy group-containing compound having an alicyclic unsaturated group, represented by the following general formula

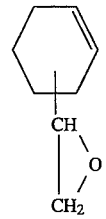 (14)

which is produced as a by-product in the partial epoxidization of vinylcyclohexene. The use of this compound in combination with 4-vinylcyclohexene-1-oxide or the like enables production of an epoxy resin having in the molecule both of an epoxy functional group of the structural formula (I) and an epoxy functional group of the structural formula (II).

The other epoxy group-containing compound to be used in ring-opening copolymerization with 4-vinylcyclohexene-1-oxide is particularly preferably a compound represented by the above general formula (3).

In the above ring-opening copolymerization,-the proportions of 4-vinylcyclohexene-1-oxide and other epoxy group-containing compound used can be selected appropriately depending upon the application of the present resin. Preferably, the ring-opening copolymer obtained has in the molecule at least 3, preferably 3 to 300, more preferably 4 to 50, epoxy group-containing functional groups represented by the structural formula (I) or (II) and also has a number-average molecular weight of 500 to 50,000, preferably 700 to 5,000.

4-Vinylcyclohexene-1-oxide can be produced by, for example, subjecting vinylcyclohexene (this can be obtained by dimerization of butadiene) to partial epoxidization with peracetic acid.

In the ring-opening homopolymerization of 4-vinylcyclohexene-1-oxide or the ring-opening copolymerization of said oxide and other epoxy group-containing compound, it is generally preferable to use a catalyst. As the catalyst, there can be mentioned, for example, amines (e.g. methylamine, ethylamine, propylamine, piperazine), organic bases (e.g. pyridines, imidazoles), organic acids (e.g. formic acid, acetic acid, propionic acid), inorganic acids (e.g. sulfuric acid, hydrochloric acid), alkali metal alcoholares (e.g. sodium methylate), alkalis (e.g. KOH, NaOH), Lewis acids or their complexes (e,g, $BF_3ZnCl_2$, $AlCl_3$, $SnCl_4$) and organometal compounds (e.g. triethylaluminum, diethylzinc).

The catalyst can be used in an amount of 0.001 to 10% by weight, preferably 0.1 to 5% by weight, based on the reaction product. The temperature of ring-opening polymerization is usually –70° to 200° C. preferably –30° to 100° C. The reaction can be effected using a solvent. The solvent is preferably an ordinary organic solvent having no active hydrogen.

The thus obtained ring-opening (co)polymer having, as side chains, vinyl groups bonding to the cyclohexene rings is subjected to partial or complete epoxidization of the vinyl groups ($CH_2=CH-$), whereby an epoxy resin (A-I) can be produced. As mentioned above, the epoxidization of vinyl groups can be effected using an epoxidizing agent such as peracid, hydroperoxide or the like. The epoxidization can be effected using, if necessary, a catalyst. In the epoxidization, the use or now use of a solvent and the reaction temperature can be appropriately determined depending upon the apparatus used and the properties of the materials used. Depending upon the conditions employed in the epoxidization, it occurs in some cases that simultaneously with the epoxidization of the side chain vinyl groups in the ring-opening polymer, the substituent represented by the following formula (V) present in the ring-opening polymer and/or the substituent represented by the following formula (VI) generated by the epoxidization makes side reactions with the epoxidizing agent, etc. to form modified substituents and accordingly the epoxy resin (A) contains these modified substituents in the skeleton.

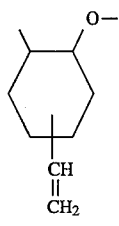

(V)

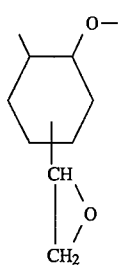

(VI)

As such modified substituents, there can be mentioned, for example, a substituent represented by the following structural formula (VII) formed when peracetic acid is used as an epoxidizing agent. It is presumed that this substituent is formed by a reaction of the resulting epoxy group with acetic acid generated as a by-product.

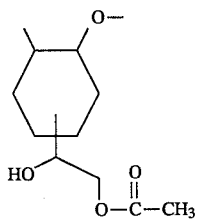

(VII)

The amount of the modified substituents contained in the epoxy resin (A) varies depending upon the type of epoxidizing agent, the molar ratio of epoxidizing agent and vinyl groups, the reaction conditions, etc.

The thus produced epoxy resin (A-I) can have a number-average molecular weight of usually about 500° to 50,000, preferably about 700 to 5,000.

The epoxy resin (A-I) having, as a functional group, mainly an epoxy group-containing functional group represented by the structural formula (I) is commercially available as, for example, EHPE 3150 (trade name) manufactured by DAICEL CHEMICAL INDUSTRIES, LTD. This commercial product is produced from 4-vinylcyclohexene-1-oxide and suitable for use in the present invention.

Thus, the resin suitable for use in the present invention contains the epoxy group-containing functional group represented by the structural formula (I), in a form represented by the above structural formula (VI).

Next, the epoxy resin having, as a functional group, mainly an epoxy group-containing functional group represented by the structural formula (II) [the resin is hereinafter referred to as "epoxy resin (A-II)" in some cases] can be obtained by, for example, subjecting at least one compound selected from the above-mentioned other epoxy group-containing compounds represented by the general formulas (1)–(12), particularly preferably at least one compound selected from the alicyclic oxirane group-containing vinyl monomers represented by the general formulas (3), (6), (7), (8), (9), (10) and (11), to homopolymerization or copolymerization with other polymerizable unsaturated monomer.

The other polymerizable unsaturated monomer can be selected from a wide range of such monomers, depending upon the desired properties of the resulting (co)polymer. Typical examples of the monomer are as follows.

(a) Esters of acrylic acid or methacrylic acid

For example, $C_{1-18}$ alkyl esters of acrylic acid or methacrylic acid, such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate, lauryl methacrylate and the like; $C_{2-18}$ alkoxyalkyl esters of acrylic acid or methacrylic acid, such as methoxybutyl acrylate, methoxybutyl methacrylate, methoxyethyl acrylate, methoxyethyl methacrylate, ethoxybutyl acrylate, ethoxybutyl methacrylate and the like; $C_{2-8}$ alkenyl esters of acrylic acid or methacrylic acid, such as allyl acrylate, allyl methacrylate and the like; $C_{2-8}$ hydroxyalkyl esters of acrylic acid or methacrylic acid, such as hydroxyethyl acrylate, hydroxyethyl methacrylate, hydroxypropyl acrylate, hydroxypropyl methacrylate and the like; and $C_{3-18}$ alkenyloxyalkyl esters of acrylic acid or methacrylic acid, such as allyloxyethyl acrylate, allyloxyethyl methacrylate and the like.

(b) Vinyl aromatic compounds

For example, styrene, α-methylstyrene, vinyltoluene and p-chlorotoluene.

(c) Polyolefin compounds

For example, butadiene, isoprene and chloroprene.

(d) Others

Acrylonitrile, methacrylonitrile, methyl isopropenyl ketone, vinyl acetate veo va monomer (product of Shell Chemical), vinyl propionate, vinyl pivalate, vinyl compounds having a polycaprolactone chain [e.g. FM-3X monomer (trade name) manufactured by DAICEL CHEMICAL INDUSTRIES, LTD.), etc.

Of the above polymerizable unsaturated monomers, particularly preferable are the esters of acrylic acid or methacrylic acid (a), particularly methyl (meth)acrylate, ethyl (meth) acrylate, butyl (meth) acrylate, 2-ethylhexyl (meth)acrylate and hydroxyethyl (meth)acrylate, as well as styrene.

In production of the epoxy resin (A-II) having, as a functional group, mainly an epoxy group-containing functional group represented by the structural formula (II), the alicyclic oxirane group-containing vinyl monomer can be used in such an amount that the produced epoxy resin (A-II) has, in the molecule, at least 3, preferably 3 to 300, more preferably 4 to 100, alicyclic oxirane groups represented by the structural formula (II). However, in order for the alicyclic oxirane groups in the epoxy resin (A-II) to be utilized (a) as a functional group to be reacted with a cationizing agent (to be described later) to introduce a cationic group into the present resin and also (b) as a functional group to allow the present resin to have curability, the above monomer is preferably used so that the monomer is present in the epoxy resin (A-II) in an amount of 5 to 100% by weight, preferably 20 to 100% by weight, based on the solid content of the epoxy resin (A-II).

The epoxy resin (A-II) having, as a functional group, mainly an epoxy group-containing functional group represented by the structural formula (II) can be produced according to the same process and conditions as usually used in the polymerization reaction based on polymerizable unsaturated bond, for production of acrylic resin, vinyl resin or the like. As an example of such a polymerization process, there can be shown a process comprising dissolving or dispersing each monomer component in an organic solvent and stirring the solution or dispersion in the presence of a radical polymerization initiator at about 60° to 180° C. The reaction time can be ordinarily about 1 to 10 hours. As the organic solvent, there can be used an alcohol, an ether, an ester, a hydrocarbon or the like. When a hydrocarbon solvent is used, it is preferable to use other solvent in combination in view of the solvency. As the radical initiator, there can be used an initiator generally used. As specific examples, there can be mentioned peroxides such as benzoyl peroxide, tert-butylperoxy-2-ethyl hexanoate and the like, as well as azo compounds such as azoisobutyronitrile, azobisdimethylvaleronitrile and the like. The epoxy resin (A-II) desirably has a number-average molecular weight of generally about 3,000 to 200,000, preferably about 4,000 to 10,000. The epoxy resin desirably has epoxy group-containing functional group represented by the structural formula (II) mainly in the form of the following formula

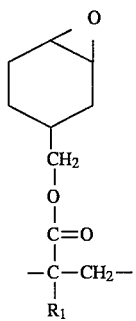

wherein $R_1$ is a hydrogen atom or methyl group. The epoxy resin (A-II) desirably has, in the molecule, epoxy group-containing functional groups in an amount of generally 3, preferably 3 to 300, particularly preferably 4 to 50.

Into the obtained epoxy resin (A) can be introduced a cationic group, by reacting part of the epoxy groups in the resin (A) with a cationizing agent (B).

As the cationizing agent (B), there can be mentioned, for example, amino compounds (e.g. aliphatic, alicyclic or aralkyl primary or secondary amines, tertiary amine salts), secondary sulfide salts and tertiary phosphine salts. These compounds are reacted with the epoxy group of the epoxy resin (A) to form a cationic group [e.g. —$NH_2$, —NH—, =N—, —$N^{\oplus}$—$RX^{\ominus}$ (R is a residue of epoxy resin (A) and X is an acid), —NH—$NH_2$]. It is also possible to form a cationic group by reacting the hydroxyl group of epoxy resin (A) with a tertiary aminomonoisocyanate obtained by the reaction of a tertiary aminoalcohol with diisocyanate.

As examples of the amino compounds as the cationizing agent, there can be mentioned the following:

(1) Primary amines such as methylamine, ethylamine, n- or isopropylamine, monoethanolamine, n- or isopropanolamine and the like.

(2) Secondary amines such as diethylamine, diethanolamine, di-n- or di-isopropanolamine, n-methylethanolamine, N-ethylethanolamine and the like.

(3) Polyamines such as ethylenediamine, diethylenetriamine, hydroxyethylaminoethylamine, ethylaminoethylamine, methylaminopropylamine, dimethylaminoethylamine, dimethylaminopropylamine and the like.

Of these amines, alkanolamines having a hydroxyl group are preferable. It is possible that the primary amino group be reacted with a ketone to block it and the remaining active hydrogen be reacted with the epoxy group of the resin (A).

As the cationizing agent (B), there can also be used, besides the above amino compounds, compounds such as ammonia, hydroxylamine, hydrazine, hydroxyethylhydrazine, N-hydroxyethylimidazoline compounds, addition products of an α,β-unsaturated carbonyl compound and a primary or secondary amine, and condensation products of hydroxyethylhydrazine and a ketone.

The basic groups which can be formed with these cationizing agents can be protonized with an acid, particularly a water-soluble organic carboxylic acid (e.g. formic acid, acetic acid, lactic acid, glycolic acid) to convert to cationic groups.

There can also be used tertiary amines such as triethylamine, triethanolamine, N,N-dimethylethanolamine, N-methyldiethanolamine, N,N'-diethylethanolamine, N-ethyldiethanolamine and the like. These tertiary amines are protonized with an acid to obtain tertiary amine salts, and the salts are reacted with epoxy groups of the epoxy resin (A) to convert to quaternary salts (cationic groups).

It is possible that besides the amino compounds, secondary sulfide salts between a sulfide (e.g. diethyl sulfide, diphenyl sulfide, tetramethylene sulfide, thiodiethanol) and an acid (e.g. boric acid, carbonic acid, organic carboxylic acid) be reacted with epoxy groups of the epoxy resin (A) to obtain tertiary sulfonium salts (cationic groups).

It is further possible that tertiary phosphine salts between a phosphine (e.g. triethylphosphine, phenyldimethylphosphine, diphenylmethylphosphine, triphenylphosphine) and the above acid be reacted with epoxy groups of the epoxy resin (A) to obtain quaternary phosphonium salts (cationic groups).

The epoxy resin (A) can be optionally reacted with a compound having at least one phenolic hydroxyl group in the molecule [this compound is hereinafter referred to as "compound (C)" in some cases] before, after or simultaneously with the introduction of cationic group thereinto, so that the resulting resin can have improved properties in corrosion resistance, etc. as a resin for electropaint.

The compound (C) has in the molecule at least one phenolic hydroxyl group capable of reacting with epoxy groups of the epoxy resin (A). As the compound (C), there can be specifically mentioned, for example, bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenyl ether, 4,4'-dihydroxydiphenylsulfone, phenolic novolac and cresol novolac. Monophenols are also useful, such as phenol, nonylphenol, α- or β-naphthol, p-tert-octylphenol, o- or p-phenylphenol and the like.

Of the above compounds (C), particularly preferable are bisphenol resins [hereinafter referred to as "compound (C')"

in some cases] such as bisphenol A type [bis(4-hydroxyphenyl)-2,2-propane] and bisphenol F type [bis(4-hydroxyphenyl) -2,2-methane], because the use of such a compound gives further improvement in corrosion resistance, etc.

Suitable as the compound (C') are, for example, those compounds represented by the following general formula (VIII), having a number-average molecular weight of at least 200, preferably about 800 to 3,000 and, on average, 2 or less, preferably 0.8 to 1.2, phenolic hydroxyl groups in the molecule.

The present resin can be obtained by reacting an epoxy resin (A) having in the molecule at least three epoxy group-containing functional groups represented by the structural formula (I) and/or (II), with a cationizing agent (B), or by further reacting with a compound (C). These reactions can be effected according to an ordinary process. The addition order of the components is not particularly restricted. The two or three components may be added simultaneously and reacted. For example, when three components are used, the epoxy resin (A) and the compound (C)

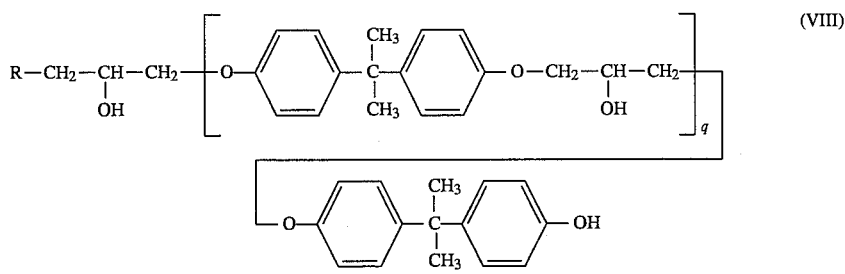

(VIII)

In the above formula, q is an integer of 0 to 7 on average, and R is a residue of an active hydrogen-containing compound. As the active hydrogen-containing compound as a precursor of R, there can be mentioned, for example, amines (e.g. secondary amines), phenols (e.g. nonylphenol), organic acids (e.g. fatty acids), thiols, alcohols (e.g. alkyl alcohols, cellosolve, butyl cellosolve, Carbitol) and inorganic acids. Most preferable of these are dialkanotamines (secondary amines having a primary hydroxyl group) and monophenols (e.g. nonylphenol). In the general formula (VIII), R— and —OH are bonded to the molecular ends. The compound represented by the general formula (VIII) may contain such a compound that the both ends are R— or —OH.

The compound (C') can be obtained by, for example, reacting 1 mole of an epoxy resin of bisphenol A diglycidyl ether type having a number-average molecular weight of at least 200, preferably 380 to 2,000, 1 mole of a polyphenol of bisphenol A type having a number-average molecular weight of at least 200, preferably 200 to 2,000 and 1 mole of an active hydrogen-containing compound, for example, a secondary dialkanolamine, at 30° to 300° C., preferably 70° to 180° C., optionally in the presence of a catalyst and a solvent. In this case, the molar ratio of the three components is not restricted and can be varied as desired.

The compound (C) includes even those compounds obtained by reacting the compound (C) [this includes the compound (C') of course] with a polyol (e.g. dimerdiol, ethylene glycol, propylene glycol, butylene glycol, trimethylolpropane), a polyether polyol (e.g. polyethylene glycol, polypropylene glycol, polybutylene glycol), a polyester polyol (e.g. polycaprolactone), their diglycidyl ether, a polycarboxylic acid, a poly- or monoisocyanate, an oxide of an unsaturated compound (e.g. ethylene oxide, propylene oxide, butylene oxide, styrene oxide), a glycidyl ether of a hydroxyl group-containing compound (e.g. allyl glycidyl ether, 2-ethylhexyl glycidyl ether, methyl glycidyl ether, phenyl glycidyl ether), a glycidyl ester of an organic acid such as fatty acid or the like, an alicyclic oxirane-containing compound or the like, and also includes even those compounds obtained by graft-polymerizing δ-4-caprolactone, an acrylic monomer or the like on the compound (C). All of these compounds act as a plasticizing component, and the present resin obtained with one of them gives an electrodeposited film suprior in smoothness, impact resistance, etc.

are reacted first at 50° to 300° C., preferably 70° to 200° C. When the reaction has reached a desired reaction stage, the reaction mixture is reacted with the cationizing agent (B). After confirming that a necessary amount of epoxy groups remain still unreacted, the reaction mixture is stabilized by cooling, or by solvent dilution, or by addition of water and optionally a neutralizing agent, The proportions of the epoxy resin (A), the cationizing agent (B) and the compound (C) can be determined appropriately.

In the present resin, the introduction of (2) cationic group and (3) epoxy group-containing functional group can be effected as mentioned above. The introduction of (1) primary hydroxyl group can be effected, for example, by using, as at least part of the cationizing agent (B), an alkanolamine having a primary hydroxyl group and accordingly effecting the introduction of cationic group and the introduction of primary hydroxyl group at the same time, or by using, as the compound (C), a trimethylolpropane-modified epoxy resin or an epoxy resin graft-polymerized with δ-4-caprolactone.

The introduction of primary hydroxyl group can also be effected as follows.

1. The epoxy resin (A-II) is copolymerized with at least one compound selected from, for example, hydroxyethyl (meth)acrylate, hydroxy-n-propyl (meth)acrylate, hydroxy-n-butyl (meth)acrylate and FM-3X, whereby the introduction of a necessary amount of primary hydroxyl group is made possible.

2. To the epoxy resin (A-I) or (A-II) is added at least one alkanolamine selected from diethanolamine, methylethanolamine, ethylethanolamine, methyl-n-propanolamine, etc., whereby the introduction of a necessary amount of primary hydroxyl group is made possible.

3. A bisphenol type epoxy resin is reacted with ε-caprolactone in the presence of, for example, a tin or titanium catalyst, to introduce primary hydroxyl group. Then, bisphenol A and an alkanolamine (e.g. diethanoiamine) are subjected to addition reaction in equimolar amounts, to obtain a primary hydroxyl group-containing compound (C).

In the present resin, the content of cationic group (amine value, etc.) is desirably as low as possible as long as the resin can be stably dispersed in water, and is generally 3 to 100, particularly 5 to 80, more particularly 7 to 70, in terms of KOH (mg/g solid resin) conversion value. Even when the content of cationic group is lower than 3, the resin can be dispersed in water by the use of a surfactant; in this case, however, it is necessary to control the type and/or content of cationic group in the resin so that the aqueous dispersion of the resin gives a pH of 4 to 9, preferably 6 to 7.

The KOH (mg/g solid resin) conversion value used above to express the content of cationic group is a value obtained by multiplying the milliequivalent of the cationic group contained in 1 g of the resin (solid resin), by the molecular weight of KOH and accordingly is shown by (milliequivalent of cationic group in g solid resin)×56.1.

The content of primary hydroxyl group is desired to be generally 10 to 1,000, particularly 50 to 700, more particularly 60 to 600, in terms of hydroxyl value, in view of the reactivity of primary hydroxyl group with free epoxy group. The content of free epoxy group of epoxy group-containing functional group is desired to be at least 200, preferably 250 to 1,000, more preferably 250 to 900, in terms of epoxy equivalent, in view of the curability of the present resin. When a bisphenol A type epoxy resin is used as the compound (C), the resulting resin of the present invention can give a film of high corrosion resistance; therefore, that compound (C) can be used in the present resin in an amount of 95% by weight or less, preferably 20 to 90% by weight, more preferably 30 to 85% by weight.

The thus obtained resin of the present invention is cationically electrodepositable and can be suitably used in resin compositions for cationically electrodepositable paint.

For preparing the resin composition for a cathodically electrodepositable paint of the present invention, for example, the resin according to the present invention, is stably dispersed in water, and then, as required, the resulting aqueous dispersion is added and mixed with a color pigment such as carbon black, titanium white, white lead, lead oxide and red iron oxide; an extender pigment such as clay and talc; an anticorrosive pigment such as strontium chromate, lead chromate, basic lead chromate, red lead, lead silicate, basic lead silicate, lead phosphate, basic lead phosphate, lead tripolyphosphate, lead silicochromate, chrome yellow, lead cyanamide, calcium plumbate, lead suboxide, lead sulfate and basic lead sulfate; or further with other additives. As the other additives that can be added, for example, a small amount of a dispersant or a nonionic surface active agent as a cissing preventing agent of the coated surface; and curing promotor may be cited.

Especially, for making an electrodeposited paint on sufficiently curable at a low temperature of not more than 160° C., it is effective to add one kind or at least two kinds of metal compound selected from among a lead compound, a zirconium compound, a cobalt compound, an aluminum compound, a manganese compound, a copper compound, a zinc compound, an iron compound, a chromium compound and a nickel compound as a catalyst.

Specific examples of these metal compounds include chelated compounds such as zirconium acetyl acetonate, cobalt acetyl acetonate, aluminum acetyl acetonate and manganese acetyl acetonate; a chelation reaction product of compounds having beta-hydroxyamino structures with lead oxide (II); and carboxylates such as lead 2-ethyl hexanoate, lead oenanthate, naphthex lead (lead naphthenate, tradename of Nihon Kagaku Sangyo Co., Ltd.), lead octanoate, lead benzoate, lead acetate, lead lactate, lead formate, lead glycoate and octanoate zircinium.

Said metal compounds may be used in an amount calculated as a metal content based on the weight of the total solids content of the resin according to the present invention of generally not more than 10% by weight, preferably not more than 5% by weight.

The thickness of a paint film obtained by electrodepositing the so prepared resin composition for a cathodically electrodepositable paint on a proper substrate is not strictly restricted. However, generally, the thickness within the range of 3 to 300 microns based on the cured paint film is suitable, and the paint film can be cured with heating at a temperature of, for example, 70° to 250° C., preferably 120° to 160° C.

A method of forming an electrodeposited paint film on the substrate using the resin composition for a cathodically electrodepositable paint of the present invention is not particularly restricted, but ordinary conditions for cathodically electrodepositing may be used. For example, the resin according to this invention are, as mentioned above, dispersed in water, the resulting aqueous dispersion is blended with, as required, pigments, a curing catalyst and other additives, further, the mixture is diluted to the concentration of the solids content of the bath within the range of 5 to 40% by weight, preferably 10 to 25% by weight, and the bath pH is adjusted within the range of 5 to 8, preferably 5.5 to 7. Next, using this electrodeposition bath, electrodeposition is carried out under the following conditions with, for example, a carbon plate (5 cm×15 cm×1 cm) being used as an anode and for example, a zinc phosphated steel (5 cm×15 cm×0.7 mm) being used as a cathode.

Bath temperature: 20° to 35° C., preferably 25
30° C.
Direct current
  Current density: 0.005 to 2 A/cm$^2$, preferably 0.01 to 1 A/cm$^2$
  Voltage: 10 to 500 V, preferably 100 to 300 V
Power feeding time: 0.5 to 5 min., preferably 2 to 3 min.

After the electrodeposition coating, the coated object is drawn up from the electrodeposition bath, rinsed with water, and then cured thermally by heating as mentioned above.

Hereinbelow, the present invention will be explained more specifically by examples. All parts and percentages in the following examples are by weight.

EXAMPLE 1

Preparation of present resin (1)

At 288° C. were melted 130 parts of methylpropanol and 1,000 parts of an epoxy resin (A) having an epoxy group-containing functional group represented by the structural formula (I) [EHPE 3150 (trade name) manufactured by DAICEL CHEMICAL INDUSTRIES, LTD., epoxy equivalent=175 to 195]. The resulting melt was cooled to 90° C. Thereto was added 150 parts of diethanolamine. The mixture was kept at 90° C. for 3 hours and then cooled to room temperature to prepare a present resin (1) having an epoxy equivalent of 290, an amine value [KOH (mg/g solid] conversion, the same applies hereinafter] of 70, a primary hydroxyl group value of 140, a number-average molecular weight of 2,000 and a solid content of 80%.

Preparation of emulsion (1)

To 100 parts of the present resin (1) were added 2 parts of lactic acid and 298 parts of deionized water with thorough stirring, to prepare an emulsion (1) having pH 6.5, an average emulsion particle diameter of 0.07μ and a solid content of 20%.

Preparation of pigment dispersion (1)

To 100 parts of the present resin (1) were added 80 parts of titanium white, 80 parts of talc, 40 parts of basic lead silicate, 6.5 parts of lactic acid and 100 parts of deionized water. The mixture was kneaded. Thereto were added 1,000 parts of glass beads, and shaking was effected by a paint shaker to obtain a pigment dispersion (1) having a solid content of 69%.

Preparation of cationic electropaint (1)

1,000 parts of the emulsion (1) and 90 parts of the pigment dispersion (1) were mixed. The mixture was diluted with 221 parts of deionized water to prepare a cationic electropaint bath having a solid content of 20% and pH 6.2.

Using this electrodeposition bath, electrodeposition was applied to a zinc phosphate-treated plate for 3 minutes at 30° C. (bath temperature) at 250 V. The resulting film was baked for 30 minutes at 160° C. to obtain a cured film having a thickness of 15μ and a pencil hardness of H. The film had the following performances.

(1) Impact resistance (1/2 inch, 500 g, 50 cm): pass
(2) Salt spray resistance (1,000 hours): pass

EXAMPLE 2

Preparation of present resin (2)

2.4 parts of azobisdimethylvaleronitrile was dissolved in a mixture of 32 parts of METHB (3,4-epoxycyclohexylmethyl methacrylate) and 8 parts of hydroxyethyl acrylate. The solution was dropwise added in 2 hours to 24 parts of butyl cellosolve heated at 100° C. The mixture was kept at 100° C. for 1 hour. After cooling to 90° C., 5.3 parts of diethanolamine was added thereto. The mixture was kept at 900° C. for 3 hours and then cooled to room temperature to obtain a present resin (2) having an epoxy equivalent of 400, an amine value of 62, a primary hydroxyl group value of 210 and a solid content of 63.5%.

Preparation of emulsion (2)

To 100 parts of the present resin (2) were added 1.3 parts of glycolic acid and 216 parts of deionized water with thorough stirring, to prepare an emulsion (2) having pH 6.3, an average emulsion particle diameter of 0.11μ and a solid content of 20%.

Preparation of pigment dispersion (2)

To 100 parts of the present resin (2) were added 40 parts of titanium white, 70 parts of talc, 2 parts of carbon, -10 parts of litharge, 5 parts of basic lead sulfate, 5 parts of glycolic acid and 60 parts of deionized water. The mixture was kneaded. Thereto were added 1,000 parts of glass beads, and shaking was effected by a paint shaker to obtain a pigment dispersion (2) having a solid content of 61%.

Preparation of cationic electropaint (2)

1,000 parts of the emulsion (2) and 55 parts of the pigment dispersion (2) were mixed. The mixture was diluted with 113 parts of deionized water to prepare a cationic electropaint bath having a solid content of 20% and pH 6.1.

Using this electrodeposition bath, electrodeposition was applied to a zinc phosphate-treated plate for 3 minutes at 30° C. (bath temperature) at 250 V. The resulting film was baked for 30 minutes at 160° C. to obtain a cured film having a thickness of 13μ and a pencil hardness of H. The film had the following performances.

(1) Impact resistance (1/2 inch, 500 g, 50 cm): pass
(2) Salt spray resistance (1,000 hours): pass

EXAMPLE 3

Preparation of present resin (3)

There were melted 475 parts of bisphenol A diglycidyl ether having an epoxy equivalent of 190, 285 parts of bisphenol A, 53 parts of diethanolamine and 80 parts of Carbitol. The melt was cooled and kept at 130° C. for 3 hours. Thereto were added 500 parts of EHPE 3150 and 55 parts of diethanolamine. The mixture was kept at 170° C. for 4 hours. Thereto was added 607 parts of methylpropanol. The resulting mixture was cooled to obtain a present resin (3) having a solid content of 65%, an epoxy equivalent (based on the epoxy group-containing functional group) of 804, an amine value of 42 and a primary hydroxyl group value of 80.

Preparation of emulsion (3)

To 100 parts of the present resin (3) were added 0.8 part of formic acid and 3.3 parts of 38% lead octoate. Thereto was added 236 parts of deionized water with thorough stirring, to prepare an emulsion (3) having pH 5.9, an average emulsion particle diameter of 0.12 and a solid content of 20%.

Preparation of pigment dispersion (3)

To 100 parts of the present resin (3) were added 60 parts of titanium white, 80 parts of clay, 10 parts of basic lead silicate, 1.6 parts of formic acid and 100 parts of deionized water. The mixture was kneaded. Thereto were added 1,000 parts of glass beads, and shaking was effected by a paint shaker to obtain a pigment dispersion (3) having a solid content of 61%.

Preparation of cationic electropaint (3)

1,000 parts of the emulsion (3) and 65 parts of the pigment emulsion (3) were mixed. The mixture was diluted with 133 parts of deionized water to prepare a cationic electropaint bath having a solid content of 20% and pH 5.7.

Using this electrodeposition bath, electrodeposition was applied to a zinc phosphate-treated plate for 3 minutes at 30° C. (bath temperature) at 250 V. The resulting film was baked for 30 minutes at 140° C. to obtain a cured film having a thickness of 15μ and a pencil hardness of 3H. The film had the following performances.

(1) Impact resistance (½ inch, 1 kg, 50 cm): pass
(2) Salt spray resistance (1,500 hours): pass

EXAMPLE 4

Preparation of present resin (4)

There was made of a solution consisting of 190 parts of bisphenol A diglycidyl ether having an epoxy equivalent of 190, 340 parts of polypropylene glycol diglycidyl ether having an epoxy equivalent of 340, 228 parts of bisphenol A, 105 parts of diethanolamine and 90 parts of ethylene glycol monobutyl ether. The solution was cooled and kept at 150° C. for 3 hours. Thereto were added 800 parts of EHPE 3150 and 30 parts of diethanoiamine. The mixture was kept at 160° C. for 4 hours. Thereto was added 1,039 parts of methylpropanol. The resulting mixture was cooled to obtain a present resin (4) having a solid content of 60%, an epoxy equivalent (based on the epoxy group-containing functional group) of 550, an amine value of 43 and a primary hydroxyl group value of 85.

Preparation of emulsion (4)

To 100 parts of the present resin (4) were added 0.75 part of formic acid and 0.8 part of 38% lead octoate. Thereto was added 202 parts of deionized water with thorough stirring, to prepare an emulsion (4) having pH 5.9, an average emulsion particle diameter of 0.08 and a solid content of 20%.

Preparation of cationic electropaint (4)

1,000 parts of the emulsion (4) and 55 parts of the pigment dispersion (2) were mixed. The mixture was diluted with 113 parts of deionized water to prepare a cationic electropaint bath having a solid content of 20% and pH 5.8.

Using this electrodeposition bath, electrodeposition was applied to a zinc phosphate-treated plate for 3 minutes at 30° C. (bath temperature) at 250 V. The resulting film was baked for 30 minutes at 140° C. to obtain a cured film having a thickness of 18μ and a pencil hardness of 3H. The film had the following performances.

(1) Impact resistance (½ inch, 1 kg, 50 cm): pass
(2) Salt spray resistance (1,500 hours): pass The cationic electropaints of Examples 1–4 were stored for 3 days at 30° C. with stirring. Using the resulting electropaints, electrodeposition and baking were effected in the same manner as in Examples 1–4 to obtain respective cured films. These cured films had the same performances as those of Examples 1–4.

"Salt spray resistance" and "impact resistance" in Examples were measured according to the following methods.

Salt spray resistance

Measured according to JIS Z 2871. When a film gives a creep of 2.0 mm or less width at one side of the linear cut previously made and a blister of 8 F or less (ASTM) at the portions other than the cut portion, the film is evaluated as "pass".

Impact resistance (DuPont method)

A test plate is placed for 24 hours in a bath of constant temperature (20±1° C.) and constant humidity (75±2%). A pad of given size and an impact center are fixed to a DuPont impact tester. The test plate is interposed between them with the film side directed upward. Then, a given weight is dropped on the impact center from a given height. When there is no breakage and no peeling of film due to impact, the film is evaluated as "pass".

What we claim is:

1. A cationically electrodepositable paint composition which consists essentially of a self-curing cationically electrodepositable resin and a curing catalyst, said resin having in the molecule:
   (1) a primary hydroxyl group,
   (2) a cationic group, and
   (3) at least one epoxy group-containing functional group represented by the following structural formula

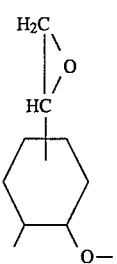

and being obtained by reacting:
   (A) an epoxy resin having in the molecule at least three epoxy group-containing functional groups represented by the above structural formula,
   (B) a cationizing agent, and
   (C) at least one compound represented by the following formula:

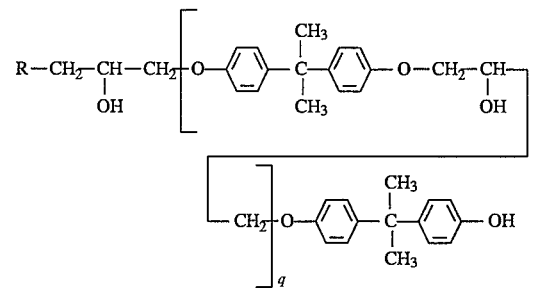

wherein q is 0 to 7, and R is a residue of an active hydrogen-containing compound selected from the group consisting of an amine, a phenol, an organic acid, a thiol, an alcohol and an inorganic acid,
   and having a number-average molecular weight of at least 200 and, on average, 2 or less phenolic hydroxyl groups in the molecule,
   said self-curing being caused by a reaction between the primary hydroxyl group (1) and the epoxy group-containing functional group (3), and
   said curing catalyst being a carboxylate of lead selected from the group consisting of lead 2-ethyl hexanoate, lead naphthenate, lead octanoate, lead benzoate, lead acetate, lead lactate, lead formate and lead glycoate.

2. A paint composition according to claim 1, wherein the epoxy resin (A) is obtained by subjecting 4-vinylcyclohexene-1-oxide to ring-opening homopolymerization or to ring-opening copolymerization with other epoxy group-containing compound using an active hydrogen-containing organic compound as an initiator and then epoxidizing at least part of the vinyl group contained in the side chain of the polyether (co)polymer formed.

3. A paint composition in claim 2, wherein the epoxy resin (A) has a number-average molecular weight of about 700 to 5,000.

4. A paint composition according to claim 1, wherein the cationizing agent (B) is an alkanolamine.

5. A paint composition according to claim 1, wherein the content of the cationic group is 3 to 100 in terms of KOH (mg/g solid resin) conversion value.

6. A paint composition according to claim 1, wherein the content of the primary hydroxyl group is 10 to 1,000 in terms of hydroxyl value.

7. A paint composition according to claim 1, which contains the carboxylate of lead in such a proportion that the metal content becomes 10% by weight or less based on the solid content of the resin.

8. A paint composition according to claim 1, wherein the compound (C) has a number-average molecular weight of 800 to 3,000 and, on average, 0.8 to 1.2 phenolic hydroxyl groups in the molecule.

* * * * *